United States Patent
Wu et al.

(10) Patent No.: US 12,494,889 B2
(45) Date of Patent: Dec. 9, 2025

(54) ARBITRATION LINE-BASED FULL-DUPLEX SPI COMMUNICATION METHOD

(71) Applicant: GUANGZHOU AUTOMOBILE GROUP CO., LTD., Guangzhou (CN)

(72) Inventors: Zhongwei Wu, Guangzhou (CN); Tianhong Wu, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 488 days.

(21) Appl. No.: 17/915,667

(22) PCT Filed: Jun. 22, 2021

(86) PCT No.: PCT/CN2021/101480
§ 371 (c)(1),
(2) Date: Sep. 29, 2022

(87) PCT Pub. No.: WO2022/017102
PCT Pub. Date: Jan. 27, 2022

(65) Prior Publication Data
US 2023/0119412 A1    Apr. 20, 2023

(30) Foreign Application Priority Data
Jul. 20, 2020    (CN) .......................... 202010696265.5

(51) Int. Cl.
*H04L 5/14* (2006.01)
*G06F 13/42* (2006.01)

(52) U.S. Cl.
CPC ............ *H04L 5/14* (2013.01); *G06F 13/4282* (2013.01)

(58) Field of Classification Search
CPC .. G06F 13/38; G06F 13/4282; G06F 13/4291; H04L 1/16; H04L 1/1607;
(Continued)

(56) References Cited

U.S. PATENT DOCUMENTS

| | | | |
|---|---|---|---|
| 2004/0225761 A1* | 11/2004 | Mitter ................. | H04L 12/4135 710/33 |
| 2009/0013329 A1* | 1/2009 | May .................... | G06F 9/30123 712/E9.032 |

(Continued)

FOREIGN PATENT DOCUMENTS

| | | |
|---|---|---|
| CN | 110234124 A | 9/2019 |
| CN | 111130710 A | 5/2020 |

*Primary Examiner* — Stephen J Clawson
(74) *Attorney, Agent, or Firm* — ScienBiziP, P.C.

(57) ABSTRACT

The present disclosure provides an arbitration line-based full-duplex SPI communication method. Said method comprises: a communication requester detecting a first arbitration line corresponding to the communication requester and a second arbitration line corresponding to a communication responder, and if both the first arbitration line and the second arbitration line are at a low potential, pulling up the potential of the first arbitration line; when the communication responder detects the first arbitration line is at a high potential, pulling up the potential of the second arbitration line; when the communication requester detects the second arbitration line is at a high potential, determining the communication responder is in a communicating state; the communication requester and the communication responder sending message header data and message text data to each other. The present disclosure solves the problem of the transmission direction and communication flexibility being limited in existing SPI communication.

12 Claims, 4 Drawing Sheets

(58) Field of Classification Search
CPC ......... H04L 5/14; H04L 67/12; H04L 67/125; H04L 67/01
See application file for complete search history.

(56) References Cited

U.S. PATENT DOCUMENTS

| | | | |
|---|---|---|---|
| 2009/0013397 A1* | 1/2009 | May | H04L 63/10 726/9 |
| 2010/0329247 A1* | 12/2010 | Kennedy | H04L 25/49 375/259 |
| 2015/0074305 A1* | 3/2015 | Sengoku | G06F 13/36 710/110 |
| 2015/0193321 A1* | 7/2015 | Ngo | G06F 1/10 714/766 |
| 2017/0235698 A1* | 8/2017 | van der Maas | G06F 11/0784 710/106 |
| 2020/0076630 A1* | 3/2020 | Pandey | H04L 12/40039 |
| 2024/0134808 A1* | 4/2024 | Fruchard | G06F 13/225 |

* cited by examiner

ARBITRATION LINE-BASED FULL-DUPLEX SPI COMMUNICATION METHOD

RELEVANT DISCLOSURE

The present disclosure claims the priority of the Chinese invention patent application with the invention name "An arbitration line-based full-duplex SPI communication method" submitted to the China Patent Office on Jul. 20, 2020, application No. 202010696265.5, and the whole content of which is hereby incorporated by reference.

TECHNICAL FIELD

The present disclosure relates to the field of automotive communication technology, in particular to an arbitration line-based full-duplex Serial Peripheral Interface (SPI) communication method.

BACKGROUND

With the continuous improvement of the functions and integration of electronic systems, multi-chip system scheme has become a common electronic product design scheme. In the multi-chip system scheme, the communication mode between chips is mainly the on-board bus (UART, IIC, SPI, etc.). In the field of automotive electronic controllers, SPI communication has become a common bus communication mode because of its simple hardware structure, simple operating principle, full duplex capability, and other characteristics; the four-wire SPI scheme can realize limited full duplex communication, and in this communication scheme, only a master device can initiate communication, while the slave device cannot initiate communication, and can only wait for the master device to initiate communication before sending data to the master device. This scheme is thus limited in transmission direction, communications flexibility, and load capacity.

SUMMARY OF THE INVENTION

The technical problem to be solved by the embodiment of the present disclosure is to provide an arbitration line-based full-duplex SPI communication method, which is used to solve the problem that existing SPI communication has great limitations in transmission direction, communication flexibility, and load capacity.

In order to solve the above technical problems, the present disclosure provides an arbitration line-based full-duplex SPI communication method, the method including:
- step S11, detecting a first arbitration line corresponding to a communication requester and a second arbitration line corresponding to a communication responder by the communication requester, pulling up a potential of the first arbitration line when both the first arbitration line and the second arbitration line are at a low potential;
- step S12, pulling up the potential of the second arbitration line when the communication responder detects the first arbitration line is at a high potential;
- step S13, determining that the communication responder is in a communicating state when the communication requester detects that the second arbitration line is at a high potential;
- step S14, sending message header data to each other by the communication requester and the communication responder;
- step S15, sending message body data to each other by the communication requester and the communication responder.

Further, in the step S12, before pulling up the potential of the second arbitration line, further including:
the communication responder detecting that its own state is normal, wherein the own state comprises memory space and communicating state.

Further, the step S14 further includes:
obtaining transmission data length of a message data of other party from the message header data of the other party respectively by the communication requester and the communication responder, and supplementing the message data which gets a shorter transmission data, so that the transmission data length of the message data of both parties is consistent.

Further, the step S13 further includes:
pulling down the potential of a chip selection signal and sending a clock signal to the communication responder by the communication requester when the communication requester is a master.

Further, after obtaining transmission data lengths of a message data of other party from the message header data of the other party respectively by the communication requester and the communication responder, and supplementing the message data which gets a shorter transmission data, so that the transmission data lengths of the message data of both parties is consistent, and further includes:
sending a chip selection signal and a clock signal corresponding to the transmission data length of a supplemented message data to the communication responder by the communication requester, and pulling down the potential of the first arbitration line.

Further, after the step S15, the method further includes:
pulling up the potential of the chip selection signal and stopping sending the clock signal to the communication responder by the communication requester;
pulling down the potential of the second arbitration line by the communication responder.

Further, the step S15 further includes:
pulling down the potential of the chip selection signal and sending a clock signal to the communication requester by the communication responder when the communication requester is a slave.

Further, after obtaining respective transmission data lengths of a message data of other party from the message header data of the other party by the communication requester and the communication responder, and supplementing the message data which gets a shorter transmission data, so that the transmission data lengths of the message data of both parties is consistent, and further includes:
sending a chip selection signal and a clock signal corresponding to the transmission data length of a supplemented message data to the communication requester and the communication responder pulling down the potential of the second arbitration line.

Further, after the step S15, the method further includes:
the communication responder pulling up the potential of the chip selection signal and stopping sending the clock signal to the communication requester;
the communication requester pulling down the potential of the second arbitration line.

Further, obtaining respective transmission data lengths of a message data of other party from the message header data of the other party by the communication requester and the communication responder, and supplementing the message data which gets a shorter transmission data, so that the transmission data lengths of the message data of both parties is consistent and further includes:

the communication requester and the communication responder obtaining the message header data of other party, wherein the message header data carries the transmission data length of the message data;

the communication requester and the communication responder comparing respective transmission data lengths of their own message data with the transmission data length of the message data of the other party;

both parties determining whether or not the transmission data length of own message data is short and if so supplementing the message data with short transmission data length with preset characters, so that the transmission data length of the message data of both parties is consistent.

Further, wherein the header data of the message comprises a field for protocol type, and the protocol type field is set to an event message type or a periodic message type;

when the header data of the message sent by the communication requester or the communication responder comprises a periodic message type, determining whether the message data is sent successfully after sending party completes the sending of the message data, the message data comprising message header data and message body data;

when the header data of the message sent by the communication requester or the communication responder comprises the event message type, sending party of the message data starts a timer corresponding to the message data, and the receiving party replies with an acknowledgement message ACK within a preset time, the party sending the message data then determining whether the message data is sent successfully and if so removing the message data from the sending queue.

Further, wherein the method further comprises:

resending the message data and starting the timer again by the sending party of when the sending party does not receive the acknowledgement message ACK from the receiving party within the preset time;

determining that the sending of the message data is failed and returning the failure information to the application layer of the sending party through the callback function by the sending party when the number of retransmissions reaches a preset number of failures.

The embodiments of the present disclosure have the following beneficial effects: According to the present disclosure, the first arbitration line and the second arbitration line are provided for determining the working state, and the communication request and the communication response of the master and the slave, so that the master can send message data to the slave and the slave can send message data to the master. When the master and the slave send data at the same time, the clock synchronization problem is resolved by adjusting the length of the data message, so that the master and the slave send data messages at the same time; no matter whether the master sends a data message to the slave, or the slave sends a data message to the master, or a data message is sent in both directions, the data message is divided into message header data and message body data. Confirmation of receiving is not required every time, which improves the transmission efficiency of the data message. In addition, for periodic messages, ACK reply is not required to confirm that the message data is sent successfully, and for important messages, ACK is used to confirm that the message data is sent successfully, which improves the efficiency of data message sending and resolves the problem of the transmission directions and communication flexibility of SPI communications being limited.

BRIEF DESCRIPTION OF THE DRAWINGS

In order to more clearly explain the embodiments of the present disclosure or the technical solutions in the prior art, the following will briefly introduce the embodiments or the drawings needed to be used in the description of the prior art. It is obvious that the drawings in the following description are only some embodiments of the present disclosure. For those skilled in the art, it is still within the scope of the present disclosure to develop other drawings according to these drawings without creative labor.

DETAILED DESCRIPTION

The following description of each embodiment refers to the attached drawings to illustrate specific embodiments of the present disclosure.

Figure 1:
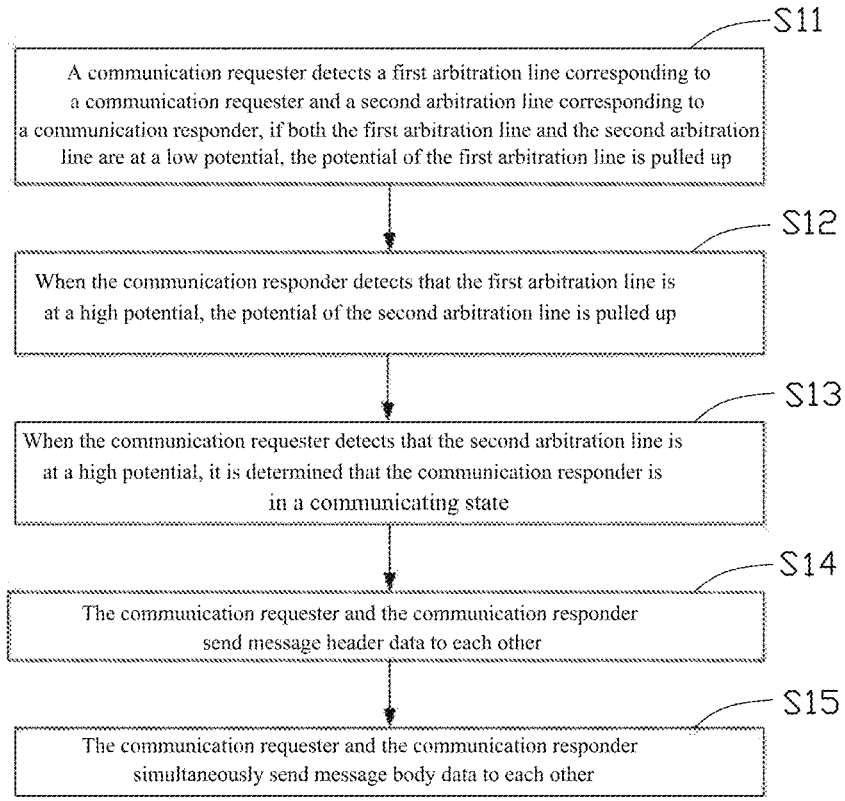
FIG. 1 is a flowchart of an arbitration line-based full-duplex SPI communication method according to an embodiment of the present disclosure.

FIG. 1 illustrates an arbitration line-based full-duplex SPI communication method according to an embodiment of the present disclosure. The method includes the following steps:

At step S11, a communication requester detects a first arbitration line corresponding to a communication requester and a second arbitration line corresponding to a communication responder, if both the first arbitration line and the second arbitration line are at a low potential, the potential of the first arbitration line is pulled up.

It should be noted that the existing four-wire SPI includes a master, one or more slaves, and four communication signal lines, these are clock line (CLK), chip selection (CS), master output signal line (MOSI), and master input signal line (MISO).

In the embodiment, two SPI communication signal lines are added, which are the first arbitration line corresponding to the communication requester and the second arbitration line corresponding to the communication responder. When the first arbitration line is at the low potential, this indicates that the communication requester is in idle state and no data message is being sent. When the second arbitration line is at low potential, it indicates that the communication responder is in idle state and no data message is being sent. Raising the potential of the first arbitration line is actually a communication request which is initiated by the communication requester.

The communication requester can be a master or a slave. When the communication requester is the master, the communication responder must be the slave. Similarly, when the communication requester is a slave, the communication requester must be a master.

At step S12, when the communication responder detects that the first arbitration line is at a high potential, the potential of the second arbitration line is pulled up.

It should be noted that before pulling up the potential of the second arbitration line, the communication responder can confirm its own state, which includes memory space and communication state. The communication responder pulls up the potential of the second arbitration line when the communication responder confirms that its own state is normal. This step is equivalent to the communication responder preparing to respond to the communication request of the communication requester.

At step S13, when the communication requester detects that the second arbitration line is at a high potential, it is determined that the communication responder is in a communicating state.

It should be noted that step S13 further includes:

When the communication requester is a master, the communication requester pulls down the potential of the chip selection signal and sends a clock signal to the communication responder.

When the communication requester is a slave, the communication responder pulls down the potential of the chip selection signal and sends a clock signal to the communication requester.

The potential of the chip selection signal is pulled down to indicate that the master selects the slave as the communication object, and the master sends the clock signal to the slave for clock synchronization.

At step S14, the communication requester and the communication responder send message header data to each other.

In the embodiment, the master and the slave send the message data bidirectionally and divide the message data into message header data and message body data for separate transmission, the master can know the specific transmission length of the frame of message data through the message header data and send a clock signal corresponding to the transmission length, it is not necessary for the slave to respond to each byte transmission, which saves time and improves efficiency.

Referring to the message structure in Table 1 and the header structure in Table 2, the protocol types in Table 2 include event message types, big data transmission types, and periodic message types.

TABLE 1

| Header information (4B) | Payload | CRC32 (4B) |
| --- | --- | --- |

TABLE 2

| Start character (1B) | protocol types (1B) | PDU length (2B) |
| --- | --- | --- |

It should be noted that the message data includes the message header data and the message body data. The message header data includes the protocol type field, and the protocol type field is set to the event message type or the periodic message type. When the message data sent by the communication requester or the communication responder contains a periodic message type, the party sending the data message can determine that the message data is sent successfully after completing the sending of the message data.

When the message data sent by the communication requester or the communication responder contains the event message type, the party sending the data message starts the timer corresponding to the data message, the party receiving the data message within the preset time replies with acknowledgement message (ACK), determines that the message data is sent successfully, and removes the message data from the sending queue.

According to the actual needs, the application layer selects and sets the important message data as the event message type, and the non-important or periodic message data as the periodic message type, for periodic message types, there is no need to confirm the message ACK, which saves the time for non-important message ACK.

The step S14 further includes:

The communication requester and the communication responder each obtain the transmission data length of the message data of the other party from the message header data of the other party, and supplement the message data with a short transmission data length, so that the transmission data length of the message data of both parties is consistent.

Specifically, the communication requester and the communication responder each obtain the message header data of the other party, and the message header data carries the transmission data length of the message data;

The communication requester and the communication responder each compare the transmission data length of their own message data with the transmission data length of the other party's message data;

Either party determines that the transmission data length of its own message data is short, and will supplement the message data with a short transmission data length with preset characters if found to be short, so that the transmission data length of the message data of both parties is consistent.

It should be noted that the opposite party of the communication requester refers to the communication responder, and the opposite party of the communication responder refers to the communication requester; either party may determine that the transmission data length of its own message data is short, and so supplement the message body data with 0x00 characters to make the transmission data length of the message data of both parties consistent.

The communication requester and the communication responder each obtain the transmission data length of the message data of the other party from the message header data of the other party, and supplement the message data with a short transmission data length, so that the transmission data length of the message data of both parties is consistent, this process further includes:

When the communication requester is a master, the communication requester sends a chip selection signal and a clock signal corresponding to the transmission data length of the supplemented message data to the communication responder, and pulls down the potential of the first arbitration line.

When the communication requester is a slave, the communication responder sends a chip selection signal and a clock signal corresponding to a longer transmission data length of the supplemented message data to the communication requester, and pulls down the potential of the second arbitration line.

At step S15, the communication requester and the communication responder simultaneously send message body data to each other.

After the step S15, the method further includes:
When the communication requester is the master, the communication requester pulls up the potential of the chip selection signal and stops sending clock signals to the communication responder;
The communication responder pulls down the potential of the second arbitration line.
When the communication requester is a slave, the communication responder pulls up the potential of the chip selection signal and stops sending clock signals to the communication requester.
The communication requester pulls down the potential of the second arbitration line.

Through the above steps, after the communication requester and the communication responder finish sending the data message, they respectively pull down the potential of the corresponding arbitration line, restore them to the idle state, and can send the next time.

Further, the message header data includes a protocol type field, and the protocol type field is set to an event message type or a periodic message type.

When the message header data sent by the communication requester or the communication responder includes the periodic message type, the party sending the message data confirms that the message data is sent successfully after completing the sending of the message data, the message data includes message header data and message body data.

When the message header data sent by the communication requester or the communication responder includes the event message type, the party sending the message data starts a timer corresponding to the message data, and the party receiving the message data within the preset time replies with the acknowledgement message ACK, the party sending the message data thus determines that the message data is sent successfully and removes the message data from the sending queue.

Further, the method further includes:
When the party sending the message data does not receive the acknowledgement message ACK replied by the party receiving the message data within the preset time, the party sending the message data resends the message data and starts the timer again.

When the number of retransmissions reaches a preset number of failures, the party sending the message data determines that the sending of the message data is failed and returns the failure information to the application layer of the party sending the message data, through the callback function.

It should be noted that the probability of success is improved by multiple retries, and the number of failures is limited, to avoid excessive waste of resources.

Figure 2:
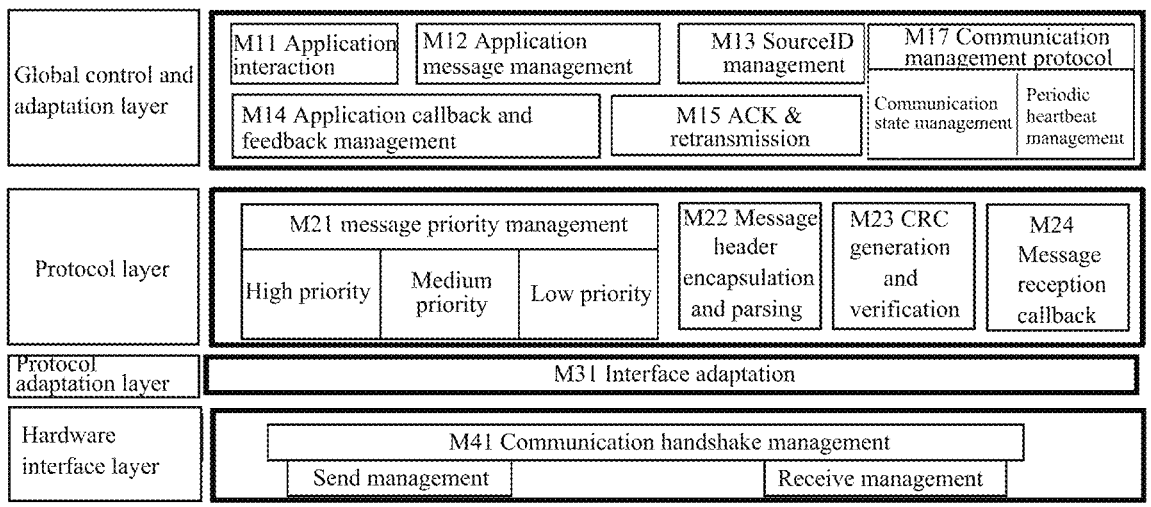
FIG. 2 shows a hierarchy of the SPI communication method and an overall architecture of each component according to an embodiment of the present disclosure.

Referring to FIG. 2, the above communication method is based on the hierarchical division of the communication method and the overall structure of each component. In FIG. 2, the global control and adaptation layer includes M11, Application interaction interface; M12, Application message management; M13, SourceID management; M14, Application callback and feedback management; M15, ACK & retransmission; M16, Communication management protocol.

M11: Application interaction interface, providing a unified calling interface, the application is realized through the provided interface allowing the sending of messages, setting the processing mode of messages, configuring message priority, registering and managing message receiving callback functions, querying communication status, etc.

M12: Application message management, the application sends the ID and type of the message to be sent to M12 through M11, then M12 controls the modules of the protocol layer to perform message transmission according to the relevant parameter setting information in the message.

M13: SourceID management, in order to distinguish each message, this module will provide a unique (at least for a period of time) serial number for each message as a voucher. When the application layer sends a message, the module will be called up to apply for the serial number in the process of assembling the message. This module generates a unique serial number according to the specified procedure, and then returns the serial number to the message assembly function.

As mentioned above, the value range of the serial number should be large enough to ensure that the whole system can distinguish each different message according to the serial number at a certain time, to avoid misoperation of messages with the same content but at different times.

M14: Application callback and feedback management, which passes the ID number and callback function in pairs into M14 through the interface provided by M11. The main function of M14 is to find the corresponding callback function according to the ID number and return the information (including sending failure, receiving message, etc.) generated during the transmission of the ID message to the application. Meanwhile, the application can use the interface provided by M11 to operate the information saved in M14.

M15: ACK & retransmission, the message protocol of this method provides two types of messages, namely periodic message and event message. See Table 3 and Table 4 for the formats.

TABLE 3

| Send | | | |
| --- | --- | --- | --- |
| Serial number (2B) | Command (2B) | Data length (2B) | Data (0-64 KB) |
| Reply | | | |
| Serial number (2B) | Length (2B) | Data (0-64 KB) | |

TABLE 4

| Field description | |
| --- | --- |
| Serial number (2 Bytes) | 0-65535 cycles |
| Command (2 Bytes) | 8 bits (command group ID) + 8 bits (command sub-ID) |
| Length (2 Bytes) | Data length within the protocol |
| Data (0-64 KB less protocol overhead) | Data |

The periodic message refers to the message sent periodically by the sender, which is characterized as not requiring a reply by the receiver to the acknowledgement message (ACK). After the event type message is sent, the receiver needs to reply to the ACK message and the sender needs to receive the ACK message before determining it is sent successfully, otherwise, the sender will retransmit or a sending failure will be found.

After sending a frame of event type message, the module starts a timer for the message, and then waits for a period of time for the ACK message as a receipt sent by the receiver. If the ACK is received in time, it is determined that the message has been sent successfully, and the message will be removed from the sending queue; if no ACK is received before timeout, it is determined for the first time that the message sending is failed, and the message is resent and retimed. When the retransmissions reaches a certain number of attempts or times, it is determined that the message has failed to be sent and the failure information is returned to the application through the callback function. After receiving a frame of event type message, the receiver generates an ACK message and sends it.

The pairing of an event type message and its ACK depends on the message serial number field of the message. After receiving the event type message, the receiver extracts the value of the message serial number field of the message and inserts it into the message serial number field of the reply ACK. After receiving the ACK, the sender will check the serial number, when the serial number is consistent with an event type message in the sending queue, it is considered that the message has been sent successfully and removed from the sending queue.

M16: Communication management protocol, this module is responsible for receiving and sending heartbeat messages and managing communication state. The communication management protocol specifically defines the format of heartbeat message. See Table 5 below for details, query the connection state of the opposite end controller and the logic of communication state transition. The communication management protocol stipulates that in an embedded product with multi-core communication, the controller that plays the role of "communication hub" is set as the master of communication state management, and the others are set as slaves. The protocol also stipulates that there is only one master and one or more slaves in the whole communication network.

TABLE 5

| Send heartbeat | | |
|---|---|---|
| Serial number (2B) | Command (1B) | Protocol version (1B) |
| Responding | | |
| Serial number (2B) | Command (1B) | Protocol version (1B) |
| Field description | | |
| Serial number (2 Bytes) | 0-65535 cycles | |
| Command (1 Bytes) | Heartbeat | |
| Protocol version (1 Bytes) | Standard protocol version symbol | |

The communication management protocol mainly includes the following sub modules: 1. Communication state management; 2. Periodic heartbeat management.

1. Communication State Management.

First, the master sends a heartbeat message according to a fixed cycle, and the slave replies to a heartbeat message according to the protocol after receiving the heartbeat message. In the communication state management module, the master will maintain the table of scores related to the communication quality of the slave as the main basis for communication state management.

When the master sends the heartbeat message, it will start the timer at the same time, and if the heartbeat message of the slave is not received within the specified time, the specified score will be deducted from the communication quality score table. On the contrary, when the heartbeat message is received and responded to by the slave within the agreed time, a certain score is added to the score table. In addition, if a message that needs to be confirmed does not receive a timely and correct reply from the receiver, one point will be deducted; on the contrary, when the confirmation is successfully received, points will be added according to the score table. When scores are deducted many times and the score is lower than a threshold value of 2, it is determined that the communication mode with the slave is "degraded" and thus blocked, that is, a next message will not be sent before the confirmation is received; when the score is lower than a threshold value of 1, it is determined that the communication is disconnected, at this time, only heartbeat messages are sent, and other messages are not sent. On the contrary, if the score is higher than a threshold value of 1, it is determined that the communication with the slave is connected but the communication mode is blocked. If the score is higher than a threshold value of 2, it is determined that the communication mode with the slave is continuous. The slave also maintains the same scoring table in its communication management protocol module, and the process is the same as above.

2. Periodic Heartbeat Management.

In the case of a master, no matter what the current communication state is, it encapsulates heartbeat messages according to a fixed cycle and sends them to the protocol layer. The heartbeat message contains information as to the version of the software of the communication method run by the controller.

In the case of a slave, no matter what the current communication state is, after receiving the heartbeat message sent by the master, it should encapsulate a heartbeat message for response and send the responded heartbeat message to the protocol layer.

The main functions of the protocol layer are to provide priority queue management for sending messages, packet header encapsulation, and parsing when sending and receiving messages, CRC generation verification, and message reception callback management.

M21 message priority management, this module manages three message priority queues, these being high, medium and low. The sending order is high->medium->low, that is, the messages in the high priority queue will be sent first until there are no messages in the queue, and the messages in the medium priority queue will be sent. The application layer configures the message priority through M11, and M12 transmits the priority parameter, this module places the message into the correct priority queue through the priority configuration parameter of the message. When the sending cycle task is executed, the message is moved to the bottom of the sending queue according to the priority order. The function of this module is to optimize the sending queue of messages, provide the priority sending function of emergency messages, and reduce the impact of message accumulation on the timeliness of application processing.

M22 message header encapsulation and parsing; after the protocol layer gets the message data of the application layer, it will add a message header field to the message data before moving it to the bottom, which is used to distinguish each message and supplement relevant information. After the protocol layer receives the message data from the protocol adaptation layer, it will parse the message body content according to the header field of the message, and send the data with the header field moved to the application layer through callback.

This module also has the function of keyword escape. Because the protocol defines that the header field of the message takes a certain value as the starting flag of a message, the specific value is not allowed to be included in the whole message. In order to avoid specific values in other positions of the message, it is necessary to define an escape algorithm to convert the specific values into other values. Taking 0x7e as an example, the escape process is as follows:

It is assumed that 0x7e is used as the start flag of the message, and if 0x7e appears in other positions, escape processing is required. The escape rules are as follows:

0x7e<->0x7d is followed by 0x02;

0x7d<->0x7d is followed by 0x01.

The protocol layer performs escape processing according to the actual message situation to ensure the uniqueness of the message header and the correct interpretation of the received message.

M23 CRC generation and verification; this module uses the standard CRC32 algorithm to calculate the CRC32 value for the message header and protocol layer message data, it is sent to the opposite end together with this message; the CRC32 value of the received message is to be verified as correct. If the CRC32 field value of the received message is equal to the calculated value, the received message is verified as correct. If not equal, an error in the received message is indicated, and the message is discarded. The main function of this module is to prevent erroneous data caused by bus interference from being uploaded to the upper layer.

M23 message reception callback; the main function of this module is to return the message parsed and verified based on M22 and M23 to the global control and adaptation layer through callback.

The main function of the interface adaptation layer is to isolate the variability of the underlying hardware interface and provide a unified hardware call interface to the protocol layer. This layer is also the key to ensuring that the method can adapt to various hardware platforms.

In the hardware interface layer, M41 communication handshake management is the key to realize the mutual sending of data by both communication parties on demand, its main function is to determine the state of the communication state arbitration line (the first arbitration line and the second arbitration line), to know the communication state of the current chip and the opposite chip (whether idle, communicating, and requesting communication status), and to quickly reach the communication sending state and send data.

Further, the party receiving the message data replying to the acknowledgement message ACK specifically includes:

When the party receiving the data message receives that the message data contains the event message type, the value of the message serial number field of the message data is taken out;

The party receiving the message data loads the value of the message serial number field of the message data into the message serial number field of the acknowledgement message ACK, sends ACK to the party sending the message data.

Further, the method further includes:

The party sending the data message receives the ACK and takes out the message serial number field of the ACK, and compares the message serial number field of the ACK with the message serial number field of all the message data in the sending queue;

When the message serial number field of ACK is the same as the message serial number field of any of the message data in the sending queue, the party sending the data message determines that the sending of any message data is successful, and removes the sending of any message data from the sending queue.

Figure 3:
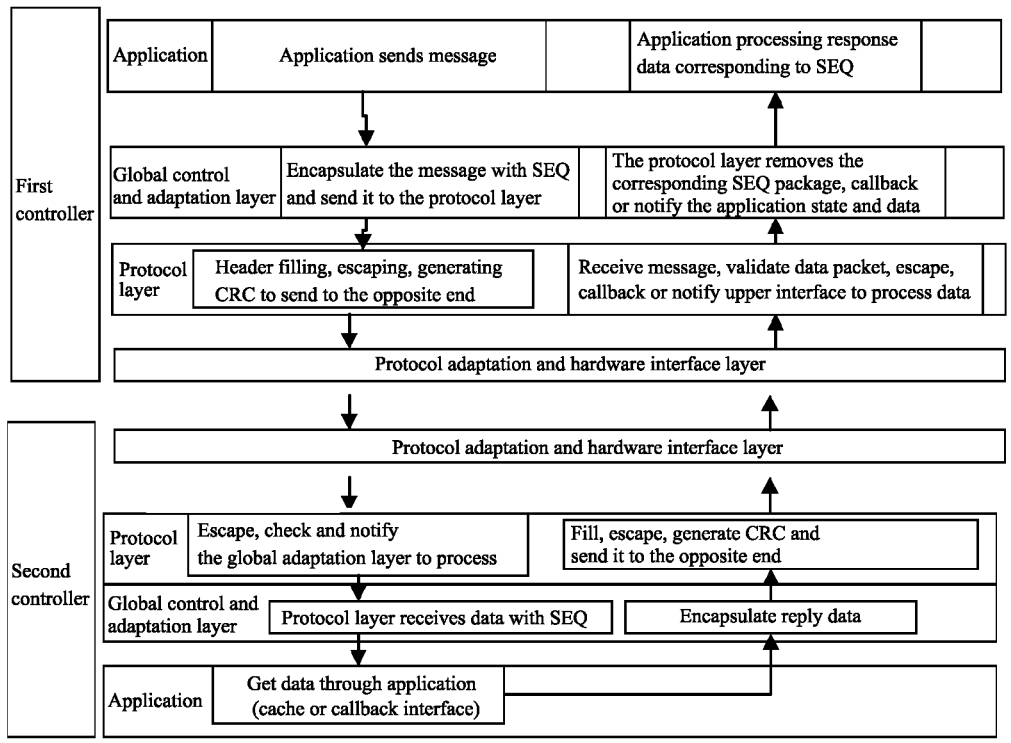
FIG. 3 is a communication flowchart of a general message protocol with ACK according to an embodiment of the present disclosure.
Figure 4:
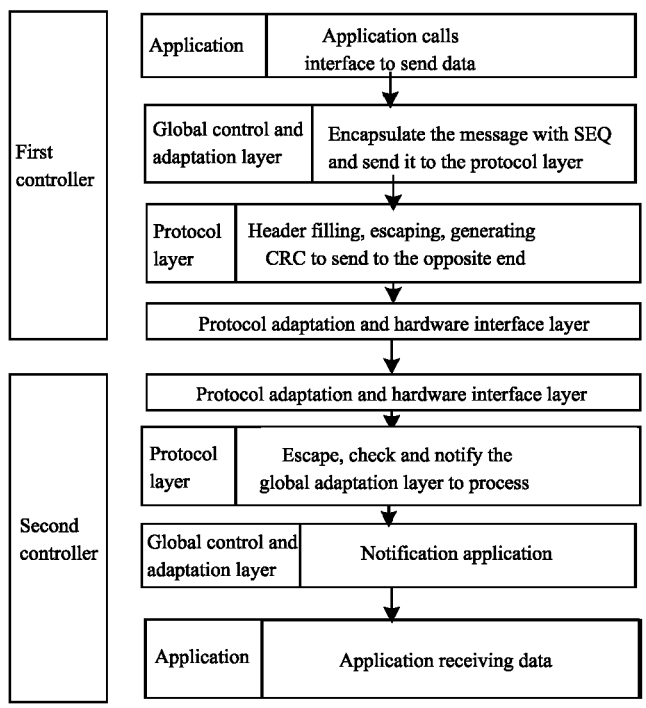
FIG. 4 is a flowchart of an ACK-free general message protocol communication according to an embodiment of the present disclosure.

FIG. 3 and FIG. 4 illustrate that the general message protocol communication process with ACK is far more complex, it takes a longer time and consumes more system resources than the general message protocol communication process without ACK. The non-ACK method is adopted for less important messages, with shorter time and higher efficiency.

Figure 5:
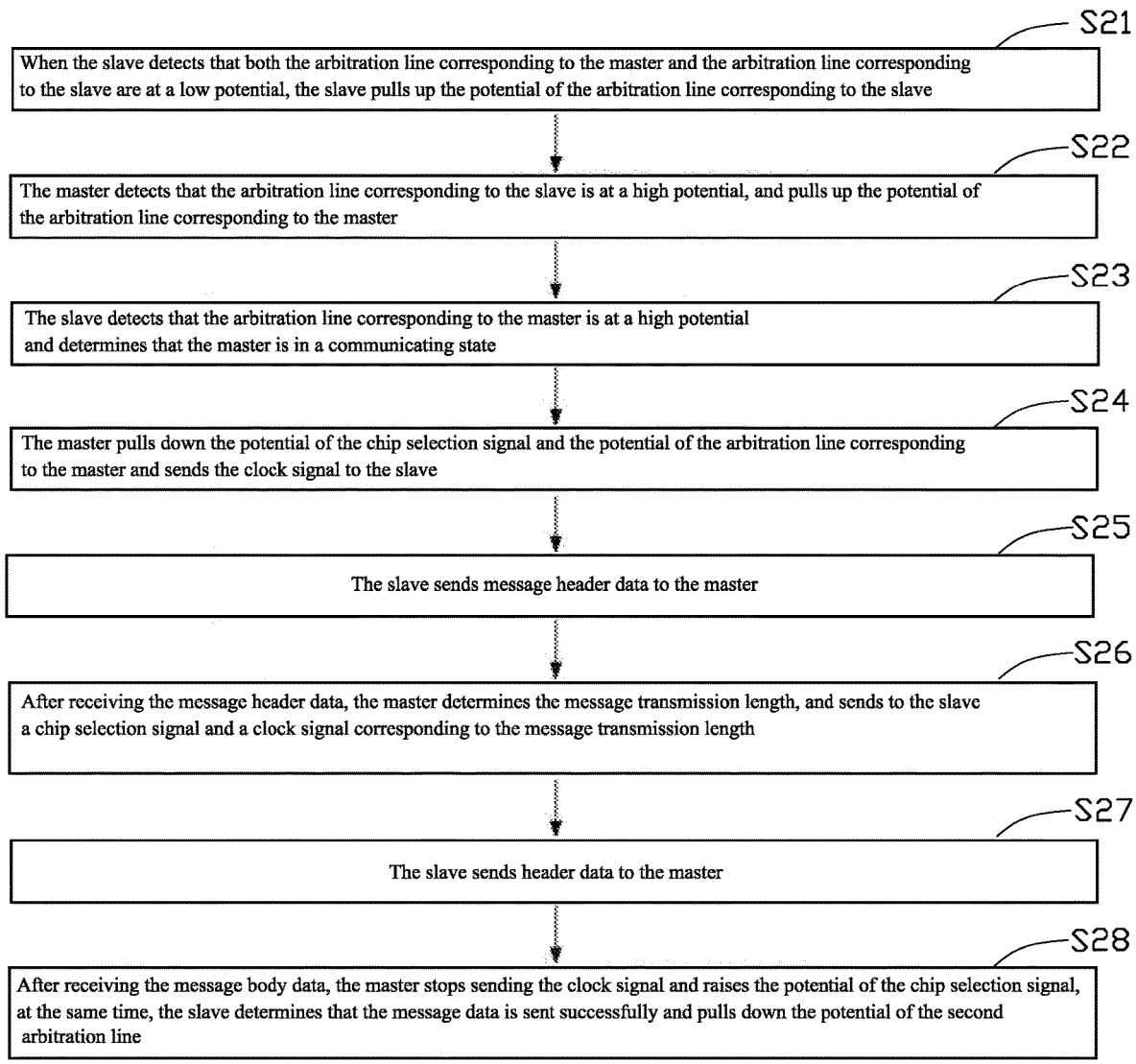
FIG. 5 is a flowchart of an arbitration line-based full-duplex SPI communication method according to an embodiment of the present disclosure.

As shown in FIG. 5, the embodiment of the present disclosure provides the arbitration line-based full-duplex SPI communication method, the method including:

At step S21, when the slave detects that both the arbitration line corresponding to the master and the arbitration line corresponding to the slave are at a low potential, the slave pulls up the potential of the arbitration line corresponding to the slave.

At step S22, the master detects that the arbitration line corresponding to the slave is at a high potential, and pulls up the potential of the arbitration line corresponding to the master.

At step S23, the slave detects that the arbitration line corresponding to the master is at a high potential and determines that the master is in a communicating state.

In step S23, the slave determines that the master is in a communicating state, and the slave is in a state of waiting for a chip selection signal and a clock signal.

At step S24, the master pulls down the potential of the chip selection signal and the potential of the arbitration line corresponding to the master and sends the clock signal to the slave.

At step S25, the slave sends message header data to the master.

At step S26, after receiving the message header data, the master determines the message transmission length, and sends to the slave a chip selection signal and a clock signal corresponding to the message transmission length.

It should be noted that in this embodiment, the slave sends the message data to the master in one direction and sends the clock signal according to the message transmission length stored in the message header data of the slave.

At step S27, the slave sends header data to the master.

In the embodiment, the slave sends message data to the master, such data is divided into message header data and message body data, which are sent successively. When the master receives a message, it does not need to respond to every byte of the message, but only needs to send a clock signal with a corresponding length. At the same time, in the process of receiving, the response will be made only after receiving the message signal of the specified length, which saves time and improves efficiency.

At step S28, after receiving the message body data, the master stops sending the clock signal and raises the potential of the chip selection signal. At the same time, the slave determines that the message data is sent successfully and pulls down the potential of the second arbitration line.

Figure 6:
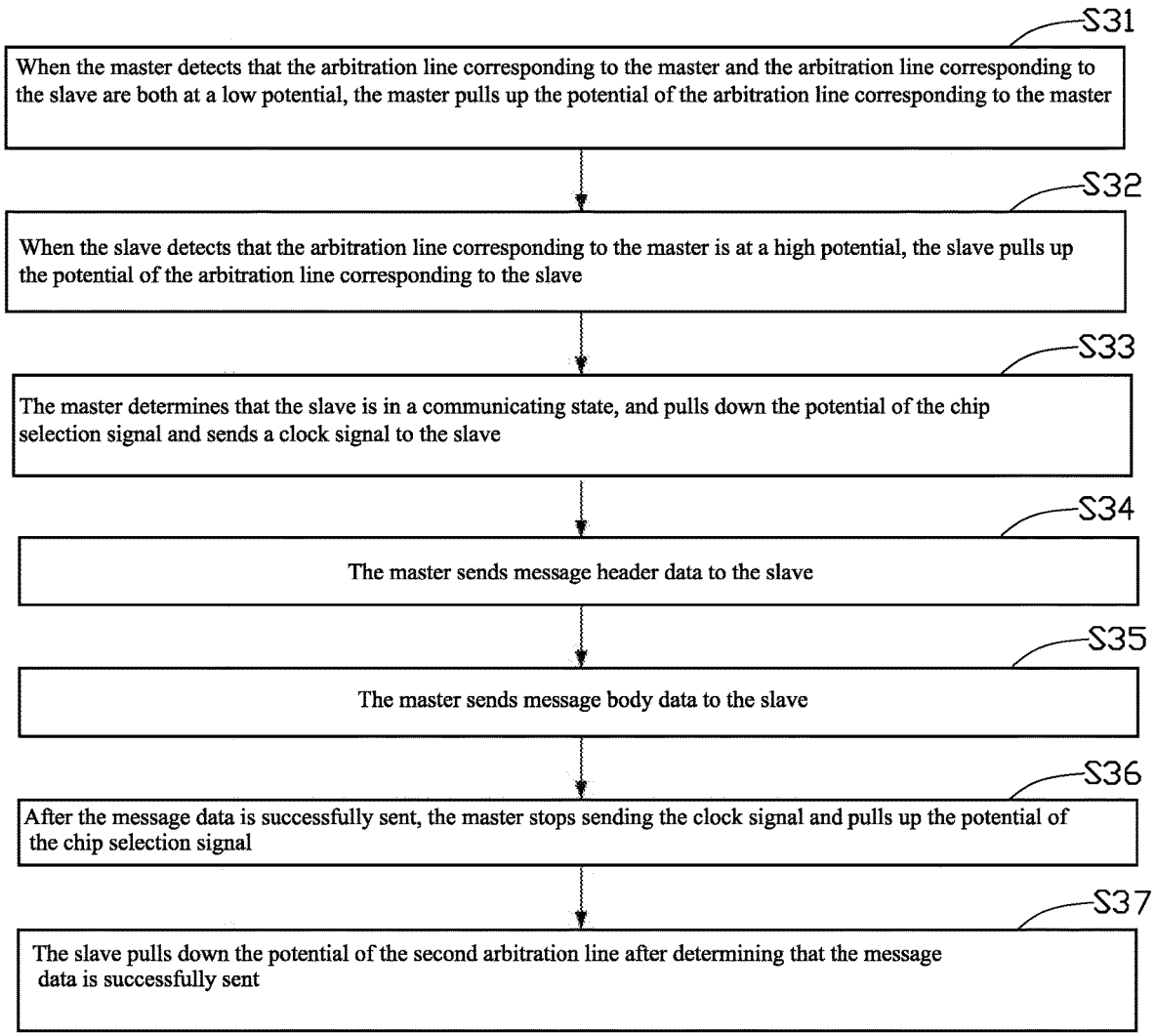
FIG. 6 is a flowchart of an arbitration line-based full-duplex SPI communication method according to an embodiment of the present disclosure.

As shown in FIG. 6, the embodiment of the present disclosure provides the arbitration line-based full-duplex SPI communication method, the method including:

At step S31, when the master detects that the arbitration line corresponding to the master and the arbitration line corresponding to the slave are both at a low potential, the master pulls up the potential of the arbitration line corresponding to the master.

At step S32, when the slave detects that the arbitration line corresponding to the master is at a high potential, the slave pulls up the potential of the arbitration line corresponding to the slave.

At step S33, the master determines that the slave is in a communicating state, and pulls down the potential of the chip selection signal and sends a clock signal to the slave.

At step S34, the master sends message header data to the slave.

At step S35, the master sends message body data to the slave.

At step S36, after the message data is successfully sent, the master stops sending the clock signal and pulls up the potential of the chip selection signal.

At step S37, the slave pulls down the potential of the second arbitration line after determining that the message data is successfully sent.

According to the present disclosure, the first arbitration line and the second arbitration line enable a determination of the working state, and a communication request and communication response of the master and the slave, so that the master can send message data to the slave and the slave can send message data to the master, when the master and the slave send data at the same time, the clock synchronization problem is solved by adjusting the length of the data message, so that the master and the slave send data messages at the same time; whether the master sends a data message to the slave, or the slave sends a data message to the master, or sends a data message in both directions, the data message is divided into message header data and message body data, it does not require the receiver to confirm every time, which improves the transmission efficiency of the data message; in addition, for periodic messages, ACK reply is not required to confirm that the message data is sent successfully, for important messages, ACK is used to confirm that the message data which was sent has been received successfully, which improves the efficiency of data message sending and solves the problem of the transmission direction and communication flexibility of existing SPI communications being limited.

The above is a further detailed description of the present disclosure in combination with the specific preferred embodiments, and it cannot be assumed that the specific implementation of the present disclosure is limited to these descriptions. For ordinary technical personnel in the technical field to which the present disclosure belongs, on the premise of not departing from the concept of the present disclosure, several simple deductions or substitutions can also be made, which shall be deemed to belong to the protection scope of the present disclosure.

What is claimed is:

1. An arbitration line-based full-duplex serial peripheral interface (SPI) communication method, wherein the method comprising:
   step S11, detecting a first arbitration line corresponding to a communication requester and a second arbitration line corresponding to a communication responder by the communication requester, pulling up a potential of the first arbitration line when both the first arbitration line and the second arbitration line are at a low potential;
   step S12, pulling up the potential of the second arbitration line when the communication responder detects the first arbitration line is at a high potential;
   step S13, determining that the communication responder is in a communicating state when the communication requester detects that the second arbitration line is at a high potential;
   step S14, sending message header data to each other by the communication requester and the communication responder; and
   step S15, sending message body data to each other by the communication requester and the communication responder.

2. The method according to claim 1, wherein in the step S12, before pulling up the potential of the second arbitration line, further comprising:
   detecting own state is normal by the communication responder, wherein the own state comprises memory space and communication state.

3. The method according to claim 1, wherein the step S14 further comprises:
   obtaining respectively transmission data length of a message data of other party from the message header data of the other party by the communication requester and the communication responder, and supplementing the message data having less transmission data length, so that the transmission data length of the message data of both parties are consistent.

4. The method according to claim 3, wherein the step S13 further comprises:
   pulling down the potential of a chip selection signal and sends a clock signal to the communication responder by the communication requester when the communication requester is a master.

5. The method according to claim 4, wherein after obtaining respectively transmission data length of a message data of other party from the message header data of the other party by the communication requester and the communication responder, and supplementing the message data having less transmission data length, so that the transmission data length of the message data of both parties are consistent, and further comprises:
   sending a chip selection signal and a clock signal corresponding to the transmission data length of a supplemented message data to the communication responder by the communication requester, and pulling down the potential of the first arbitration line.

6. The method according to claim 5, wherein after the step S15, the method further comprises:
   pulling up the potential of the chip selection signal and stopping sending the clock signal to the communication responder by the communication requester; and
   pulling down the potential of the second arbitration line by the communication responder.

7. The method according to claim 3, wherein the step S15 further comprises:
   pulling down the potential of the chip selection signal and sends a clock signal to the communication requester by the communication responder when the communication requester is a slave.

8. The method according to claim 7, wherein after obtaining respectively transmission data length of a message data of other party from the message header data of the other party by the communication requester and the communication responder, and supplementing the message data having less transmission data length, so that the transmission data length of the message data of both parties are consistent, and further comprises:
   sending a chip selection signal and a clock signal corresponding to the transmission data length of a supplemented message data to the communication requester and pulling down the potential of the second arbitration line by the communication responder.

9. The method according to claim 8, wherein after the step S15, the method further comprises:
   pulling up the potential of the chip selection signal and stopping sending the clock signal to the communication requester by the communication responder; and
   pulling down the potential of the second arbitration line by the communication requester.

10. The method according to claim 3, wherein obtaining respectively transmission data length of a message data of other party from the message header data of the other party by the communication requester and the communication responder, and supplementing the message data having less transmission data length, so that the transmission data length of the message data of both parties are consistent further comprises:
- obtaining respectively the message header data of other party by the communication requester and the communication responder; wherein the message header data carries the transmission data length of the message data;
- comparing respectively the transmission data length of their own message data with the transmission data length of the message data of the other party by the communication requester and the communication responder; and
- determining, by either party, that their own message data has less transmission data length and supplementing their own message data having less transmission data length with preset characters, so that the transmission data length of the message data of both parties are consistent.

11. The method according to claim 1, wherein the header data of the message comprises a protocol type field, and the protocol type field is set to an event message type or a periodic message type;
- when the header data of the message sent by the communication requester or the communication responder comprises a periodic message type, after a party sending the message data completes sending the message data, determines that the message data is sent successfully, the message data comprises message header data and message body data; and
- when the header data of the message sent by the communication requester or the communication responder comprises the event message type, a party sending the message data starts a timer corresponding to the message data, the party receiving the message data replies with an acknowledgement message ACK within a preset time, the party sending the message data determines that the message data is sent successfully and removes the message data from the sending queue.

12. The method according to claim 11, wherein the method further comprises:
- resending the message data and starting the timer again by the party sending the message data when the party sending the message data does not receive the acknowledgement message ACK replied by the party receiving the message data within the preset time; and
- determining that the sending of the message data fails and returning the failure information to the application layer of the party sending the message data through the callback function by the party sending the message data when the number of retransmissions reaches the preset number of failures.

* * * * *